United States Patent
Hegmann et al.

(10) Patent No.: US 11,369,898 B2
(45) Date of Patent: Jun. 28, 2022

(54) FILTER ELEMENT

(71) Applicant: HYDAC FILTER SYSTEMS GMBH, Sulzbach/Saar (DE)

(72) Inventors: Martin Hegmann, Gersheim (DE); Andreas Schunk, Waldmohr (DE)

(73) Assignee: HYDAC FILTER SYSTEMS GMBH, Sulzbach/Saar (DE)

( * ) Notice: Subject to any disclaimer, the term of this patent is extended or adjusted under 35 U.S.C. 154(b) by 337 days.

(21) Appl. No.: 16/343,441

(22) PCT Filed: Oct. 11, 2017

(86) PCT No.: PCT/EP2017/001201
§ 371 (c)(1),
(2) Date: Apr. 19, 2019

(87) PCT Pub. No.: WO2018/082799
PCT Pub. Date: May 11, 2018

(65) Prior Publication Data
US 2019/0255466 A1    Aug. 22, 2019

(30) Foreign Application Priority Data
Nov. 4, 2016  (DE) .................... 10 2016 013 166.7

(51) Int. Cl.
*B01D 29/21* (2006.01)
*B01D 29/11* (2006.01)
(Continued)

(52) U.S. Cl.
CPC ............ *B01D 29/21* (2013.01); *B01D 29/111* (2013.01); *B01D 29/232* (2013.01); *B01D 29/58* (2013.01);
(Continued)

(58) Field of Classification Search
CPC .... B01D 29/111; B01D 29/21; B01D 29/232; B01D 29/58; B01D 35/005; B01D 36/003;
(Continued)

(56) References Cited

U.S. PATENT DOCUMENTS 2,387,368 A    10/1945  Gordon
2,801,009 A *   7/1957  Bowers .................. B01D 29/21
                                              210/493.4
(Continued)

FOREIGN PATENT DOCUMENTS

DE          24 36 080       5/1975
DE      10 2009 006 586     6/2010
(Continued)

OTHER PUBLICATIONS

"Machine Translation of DE 10 2014010196", Oberli et al., DE 10 2014010196 A1, published Jan. 14, 2016, 17 total pages. (Year: 2016).*

(Continued)

*Primary Examiner* — Dirk R Bass
(74) *Attorney, Agent, or Firm* — Wenderoth, Lind & Ponack, L.L.P.

(57) ABSTRACT

A filter element (3) is designed as a replacement element and has filter medium (59) formed as a hollow body and extending between two closure parts in the form of end caps (13, 19). The filter medium is pleated with individual filter folds (66), and includes a filter material (61) made of cellulose.

16 Claims, 5 Drawing Sheets

(51) Int. Cl.
  *B01D 29/23* (2006.01)
  *B01D 29/58* (2006.01)
  *B01D 39/18* (2006.01)
  *B01D 35/00* (2006.01)
  *B01D 36/00* (2006.01)
  *B01D 39/16* (2006.01)

(52) U.S. Cl.
  CPC ......... *B01D 35/005* (2013.01); *B01D 36/003* (2013.01); *B01D 36/006* (2013.01); *B01D 39/1615* (2013.01); *B01D 39/18* (2013.01)

(58) Field of Classification Search
  CPC ... B01D 36/006; B01D 39/1615; B01D 39/18
  See application file for complete search history.

(56) References Cited

U.S. PATENT DOCUMENTS

| | | | |
|---|---|---|---|
| 3,313,417 | A | 4/1967 | Rosaen |
| 3,827,566 | A * | 8/1974 | Ponce ................ B01D 29/58 |
| | | | 210/338 |
| 3,931,011 | A | 1/1976 | Richards et al. |
| 5,552,048 | A * | 9/1996 | Miller ................ B01D 29/012 |
| | | | 210/489 |
| 2007/0289915 | A1* | 12/2007 | Jiang ..................... B01D 27/06 |
| | | | 210/338 |
| 2008/0245719 | A1 | 10/2008 | Beard et al. |
| 2012/0037556 | A1 | 2/2012 | Beard et al. |
| 2013/0152948 | A1 | 6/2013 | Inagaki et al. |
| 2014/0231366 | A1* | 8/2014 | Ries ..................... B01D 29/117 |
| | | | 210/806 |
| 2016/0023149 | A1 | 1/2016 | Schouweiler et al. |
| 2017/0050134 | A1* | 2/2017 | Veit ...................... B01D 29/15 |

FOREIGN PATENT DOCUMENTS

| | | |
|---|---|---|
| DE | 10 2011 119 868 | 6/2013 |
| DE | 10 2012 022 285 | 5/2014 |
| DE | 10 2015 005 562 | 11/2015 |
| DE | 10 2014 010 196 | 1/2016 |
| EP | 2 609 966 | 7/2013 |
| GB | 880537 | 10/1961 |
| WO | 2016/005014 | 1/2016 |

OTHER PUBLICATIONS

"Machine Translation of DE 10 2015005562", Veit et al., DE 10 2015005562 A1, published Nov. 5, 2015, 42 total pages. (Year: 2015).*

"Machine Translation of DE 102012022285", Lang, DE 10 2012022285 A1, published May 15, 2014, 14 total pages. (Year: 2014).*

International Search Report dated Mar. 14, 2018 in International (PCT) Application No. PCT/EP2017/001201.

* cited by examiner

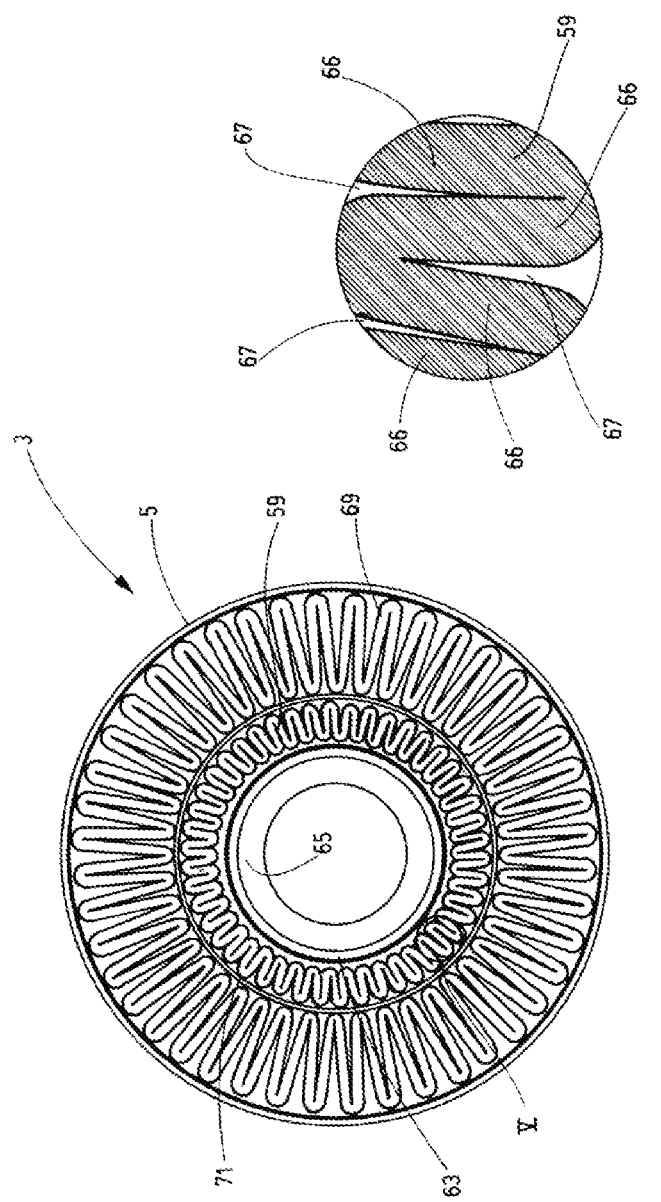

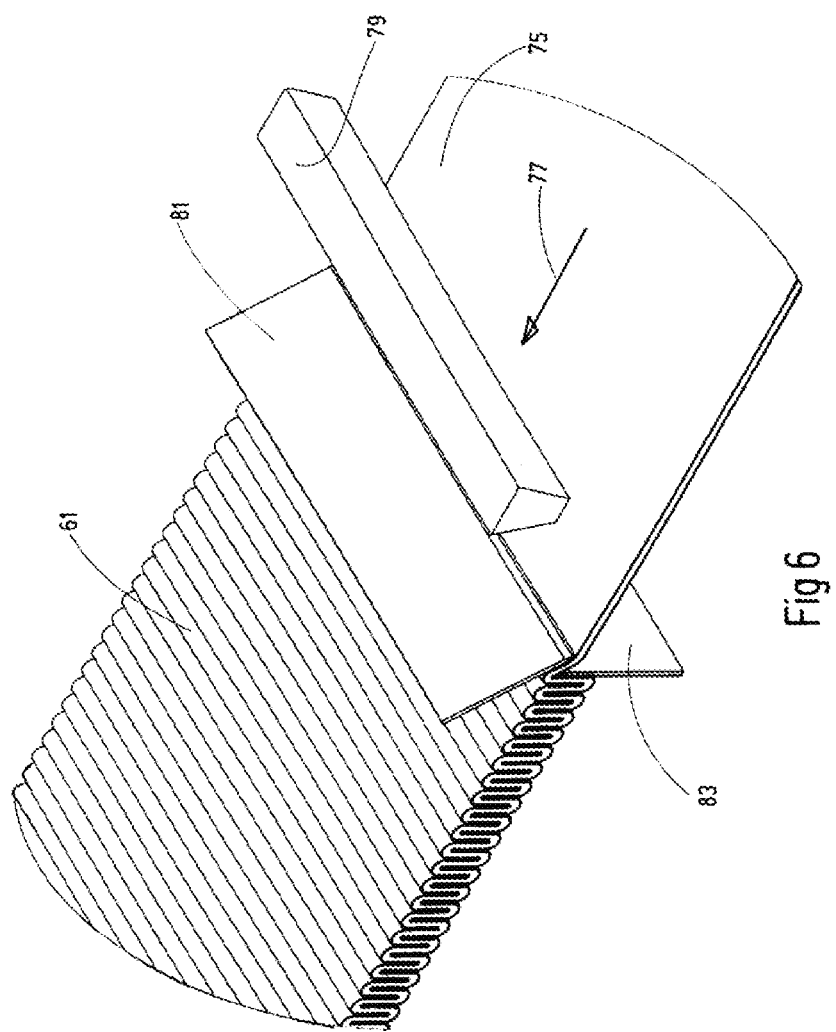

FILTER ELEMENT

FIELD OF THE INVENTION

The invention relates to a filter element designed as a replacement element. The filter medium is formed as a hollow body, extends between two closure parts, in particular in the form of end caps, and is pleated with individual filter folds. The invention further relates to a device for replaceably receiving such a filter element and to a method for producing a filter medium made of cellulose for such a filter element.

BACKGROUND OF THE INVENTION

Filter elements of this type are prior art. Such filter elements are widely used in hydraulic systems of diverse designs in order to ensure the operational reliability of the systems concerned by removing contaminating foreign substances from the hydraulic fluid. Such filter elements are also used advantageously in fuel supply systems. For example, DE 10 2011 119 868 A1 discloses a filter device for fluids such as diesel fuel that are contaminated with water admixtures. The device has a filter element through which the fluid concerned can flow from the dirty side to the clean side in a filter housing. For multiphase filtration and water separation, the filter element has at least one filter material that mainly separates water and a filter material that mainly retains particulate contaminants. A water collector is present for receiving the separated water. A coalescing filter medium serves as the filter material that mainly separates water.

However, fluids such as hydraulic fluids frequently also have emulsified water constituents, which need to be separated out, at least partially, during filtration. Typical filter elements of prior art design frequently do not adequately fulfill this requirement.

SUMMARY OF THE INVENTION

With respect to these problems, the invention is based on the object of providing a filter element that enables a particularly effective separation of water in the filtering of fluids with an oil-water emulsion, which filter element operates in a functionally reliable manner and can be produced economically.

According to the invention, this object is basically achieved with a filter element having, as an essential feature of the invention, a filter element having a filter material made of cellulose. As the fluid flows through, the cellulose fibers exert a coalescing effect, thus causing enlarged droplets to form from the aqueous fraction of the emulsion. Owing to the difference in density of water and oil, these droplets descend and are then separated from the less dense medium. In practical tests, it turned out that such a filter element performs that water separation in a functionally reliable manner and is furthermore economical to produce. Owing to the pleating of the filter medium with the resulting formation of individual filter folds, the filter surface area is significantly increased such that the separation is induced in a particularly effective and consequently highly efficient manner. There is not any counterpart to this in the prior art.

The pleated filter medium, which forms the hollow body, is preferably firmly connected on its two adjacent, mutually facing longitudinal edges by a weld and/or an adhesive bond. The lateral geometry is permanently secured by the firm connection.

In particularly advantageous exemplary embodiments, the cellulose filter medium with a uniform thickness of more than 2 mm has equally high filter folds, which are provided with equal bend or fold radii in the valleys and peaks and which merge into one another in one piece, omitting the weld and/or adhesive bond. A powerful coalescing effect, which in turn enables a particularly effective water separation, is achievable with this uniform thickness and the uniform fold geometry.

Advantageously, it can be arranged such that the bend radii in the valleys and peaks of all folds are equal and such that the filter medium shaped into the hollow body delimits fluid spaces tapering towards each other with individual filter folds. The succession of the fluid spaces thus formed ensures an incident flow onto the greatest possible exposed filter surface area of the cellulose material.

The cellulose filter medium can be used in a particularly advantageous manner for separating water from hydraulic fluids. The filter medium enlarges the water droplets in the water-oil mixture in terms of volume. Owing to the difference in density between water and oil, the water droplets descend under the effect of gravity. A separation process takes place under the influence of gravity.

In particularly advantageous exemplary embodiments, the cellulose filter medium is provided with at least one protective layer, such as a non-woven or woven fabric, on at least one of its sides, such as the filtrate side and the unfiltrate side. This protective layer follows the contour of the folds. The cellulose material is then protected on both sides from damage. A protective fabric can advantageously be a fine metal mesh such as the one provided with a mesh pack in prior art filter elements.

In a particularly advantageous manner, it can be arranged such that the cellulose filter medium is enveloped by a particle filter. This particle filter can function as a prefilter during the filtration process.

For this purpose, it can be advantageously arranged such that the particle filter has a further pleated filter medium, of which the filter folds have a greater packing density and possess a greater fold height than the filter folds of the filter medium made of cellulose material. The particle filter can be made out of several material layers in the manner typical for such filter media.

In advantageous exemplary embodiments, a fluid-permeable support tube is arranged between both filter media, and a further support tube is preferably arranged on the side of the cellulose filter facing away from the first support tube. Support tubes extending between the end caps increase the stability of the construction unit of the filter element.

In advantageous fashion, the two opposite end caps, as closure parts, can receive the two hollow bodies configured as hollow cylinders of both filter media between themselves. The particle filter preferably envelops the cellulose filter on the downstream side thereof.

Also subject matter of the invention is a device for replaceably receiving a filter element. Accordingly, the device has a filter housing with a receiving chamber for the filter element with several fluid connection points. The device is characterized in that the receiving chamber is at least partially traversed by a receiving rod, on which the filter element can be centrally positioned. The filter element can be secured on the rod by one of its end caps and an additional securing mechanism. A space-saving design of the filter housing is possible because provision is made of a central holding mechanism with a centrally located inner holding rod and an associated securing mechanism for the filter element. Consequently, there are no mechanisms for holding the filter element that project past the outer circumference of the filter element.

Advantageously, it can be arranged such that, in the state in which the filter element is installed on the receiving rod in the housing, each end cap is mounted via a spacer with a sealing function on both the securing mechanism and an intermediate bottom of the housing. The securing mechanism thus assumes the additional sealing of the filtrate side in the filter housing.

In the case of a flow through the filter element from outside to inside or from inside to outside, the intermediate bottom together with the filter element can separate a water collection chamber with oil and water fluid connection points on the clean side from an unfiltrate chamber. The unfiltrate chamber has a fluid connection point for supplying the oil-water mixture on the unfiltrate side of the filter element.

Advantageously, the housing can be designed as a part for installation in a fluid tank and closed to the environment by a removable housing lid.

The subject matter of the invention is also a method for producing a cellulose filter medium for a filter element. The method comprises at least the following production steps:

Moistening a flat filter pad made of cellulose material,
Pleating the moistened filter pad by a pleating machine,
Forming a preferably cylindrical hollow body,
Joining both longitudinal sides of the hollow body by a welding and/or bonding process, and
Drying the cellulose filter medium.

The following supplementary production steps may be provided for the method:

Applying a layer, preferably made of non-woven or woven fabric, to one side, preferably both sides, of the flat cellulose filter pad, and
Pleating each further layer together with the filter pad by the pleating machine.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 4 is a plan view in section of the exemplary embodiment of the filter element of FIG. 3;

FIG. 5 is a partial enlarged plan view in section of the circled area designated by V in FIG. 4; and FIG. 6 is a partial, schematically simplified perspective view of a part of a pleating mechanism for producing the cellulose filter medium according to the production method of the invention.

DETAILED DESCRIPTION OF THE INVENTION

Figure 1:
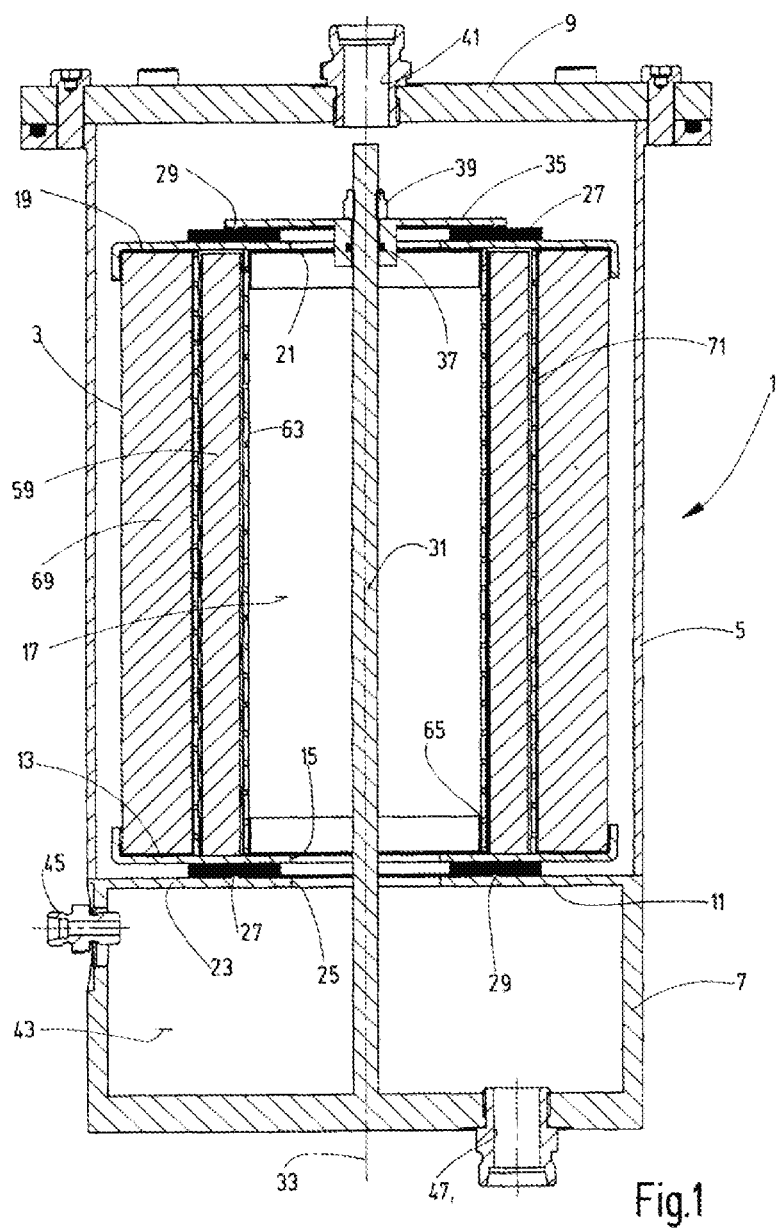
FIG. 1 is a side view in section of a filter device according to a first exemplary embodiment of the invention, which is provided for receiving a filter element according to an exemplary embodiment of the invention.
Figure 2:
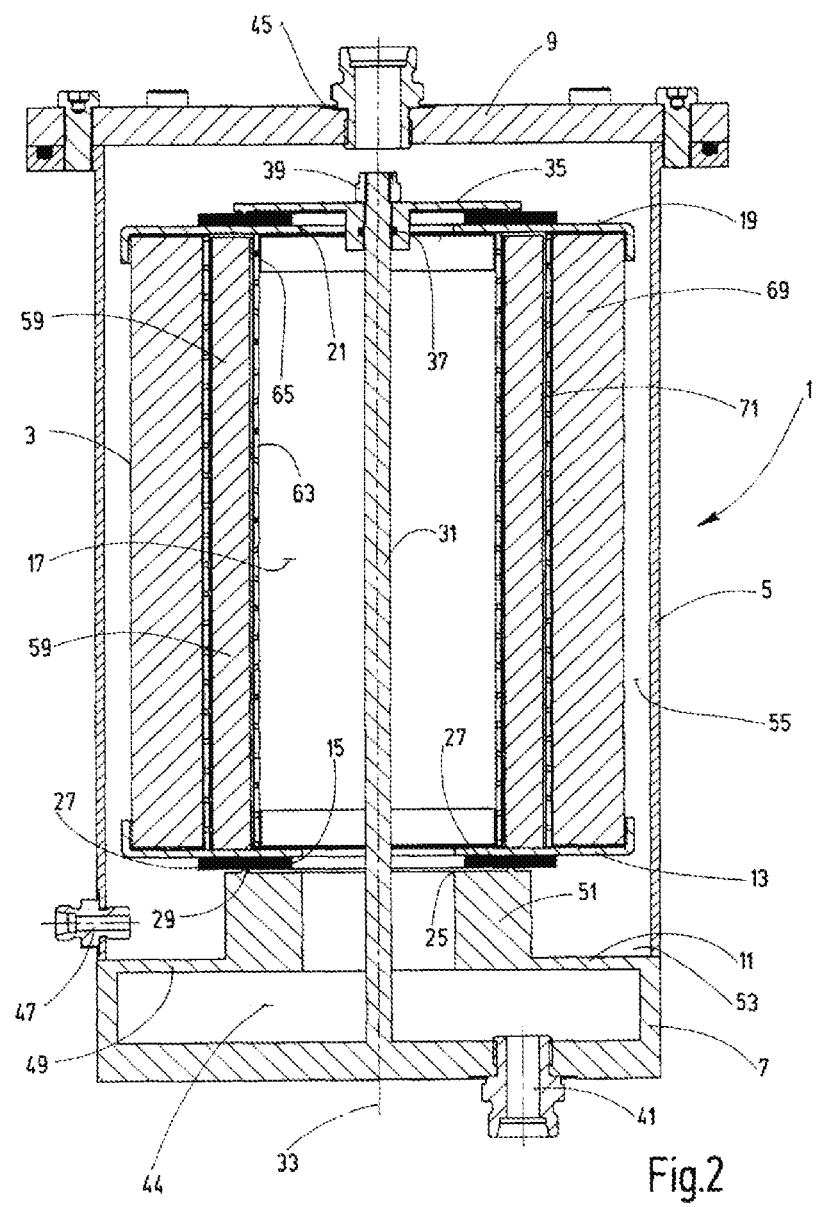
FIG. 2 is a side view in section of a filter device according to a second exemplary embodiment of the invention.

A filter housing 1, which is provided for receiving a filter element 3 according to an exemplary embodiment of the invention, in FIGS. 1 and 2. The filter housing 1 has a main part 5 in the shape of a hollow cylinder, which is closed on the bottom end in the figures by a bottom part 7, which is welded to the main part 5. On the top end, the filter housing 1 is closed by a housing lid 9, which can be taken off for installing and removing the filter element 3. When installing the filter device in a fluid tank, for example in a storage tank for hydraulic fluid, the housing lid 9 can form the closure for a tank opening. An intermediate bottom 11, on which the filter element inserted in the receiving chamber is mounted with its bottom closure part, is formed in the receiving chamber by the bottom part 7. This bottom closure part is formed by a typical plastic end cap 13, which has a central opening 15 as an access to the inner filter cavity 17 of the filter element 3. A top end cap 19, corresponding to the bottom end cap 13, which also possesses a central opening 21, is provided as a top closure part.

In the exemplary embodiment illustrated in FIG. 1, which provides for a flow through the filter element 3 from the outside thereof to the inner filter cavity 17, the intermediate bottom 11 possesses a flat wall 23 as a bearing surface for the filter element 3. Flat . . . wall 23 extends uninterruptedly from its outer circumference to its inner circumference and has a central passage opening 25 that coaxially aligns with the opening 15 of the superimposed filter element 3. The bottom end cap 13 is mounted on the wall 23 via a sealing element forming a spacer 27. For the sealing function, the spacer 27 can be made of an elastomer or metallic sealing element. On the bearing surface for the spacer 27, the wall 23 of the intermediate bottom 11 has a slightly projecting, circumferential annular rib 29, which forms a sealing edge with the spacer 27.

For securing the filter element 3 on the mounting on the intermediate bottom 11, a receiving rod 31 is provided. Rod 31 extends coaxially to the longitudinal housing axis 33 through the inner filter cavity 17 of the superimposed filter element 3, starting from the floor of the bottom part 7. To form a securing mechanism, a clamping plate 35 is mounted slidably on the top end region of the receiving rod 31 and sealed with respect to the rod 31 by a sealing ring 37. The clamping plate 35 overlapping the top end cap 19 can be pressed against the filter element 3 by a nut 39 seated on a male thread of the rod 31. In a manner analogous to the holder formed on the bottom end cap 13, a spacer 27 with a sealing function is inserted between the clamping plate 35 and the end cap 19. The clamping plate 35, for improving the seal, also has a projecting circumferential annular rib 29 that forms a sealing edge. In the exemplary embodiment of FIG. 1, which provides for a flow through the filter element 3 from the outside to the inside, a fluid connection point 41 for supplying an oil-water emulsion as unfiltrate is situated on the housing lid 9. A connection point 45 is provided on the bottom part 7 for the outflow of the oil as filtrate from the chamber 43 of the bottom part, which connection point is situated in proximity to the top wall 23. A further connection point 47 is situated on the floor of the chamber 23, and thus, on the bottom, as an outlet for separated water.

In the exemplary embodiment of FIG. 2, the flow through the filter element 3 is from the inner filter cavity 17 to the outside. The design of the intermediate bottom 11 is modified with respect to FIG. 1, with the design of the fixation of the filter element 3 by the securing mechanism otherwise remaining the same. Instead of the flat, uninterrupted wall 23 of FIG. 1, the intermediate bottom 11 forms an outer circular disc 49. On the radially inner end of disc 49 is attached an upwardly projecting annular body 51. The top end face of annular body 51 forms the bearing for the bottom end cap 13 of the filter element 3. As in FIG. 1, a spacer 27 with a sealing function is positioned on the bearing surface, and a projecting annular rib 29 is provided as a sealing edge on the bearing surface of the annular body 51. In this form of the intermediate bottom 11, the connection point 41 for the oil-water emulsion is situated on the floor of the chamber 44, which is connected to the inner filter cavity 17. The chamber 53 surrounding the annular body 51, which is connected to the filtrate side 55 on the outside of the filter element 3, forms a water collection chamber on which the connection point 47 for the outflow of separated water is situated. In this case the connection point 45 for discharging the oil as filtrate is provided in a central location on the lid 9.

Figure 3:
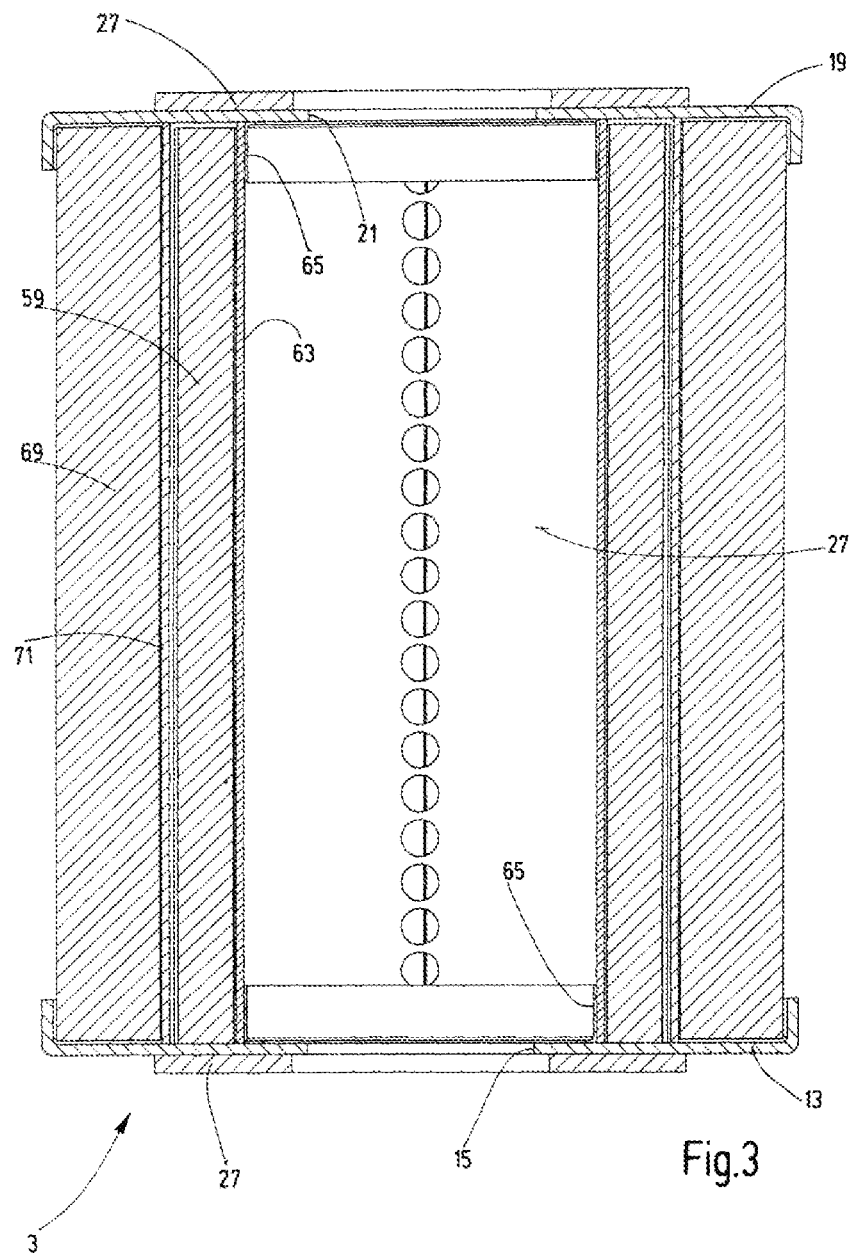
FIG. 3 is a side view in section of the filter element, illustrated separately, according to the exemplary embodiment of FIG. 1.

Details of the filter element 3 are shown more clearly in FIGS. 3 to 5. The filter medium situated between the end caps 13, 19 has a cellulose filter material 59, formed into a pleated filter pad 61 (FIG. 6) which is shaped into a circular cylindrical hollow body. The hollow body is closed at the joint by a bonded or welded lengthwise seam. According to the method of the invention, the cellulose filter material 59 is pleated from a filter pad 61 with a uniform thickness of more than 2 mm in such a way that equally high filter folds are formed, which folds have equal bend or fold radii in the valleys and peaks. A fluid-permeable support tube 63 extending from end cap to end cap abuts on the inside of the hollow body of the cellulose filter material 59, which also extends between the end caps 13 and 15. As is most readily discernible in FIG. 3, a support ring 65, which holds the support tube 63 in contact with the inside of the cellulose filter material 59, abuts the inside of each end cap 13 and 19. As the enlarged portion depicted in FIG. 5 shows, tapered fluid spaces 67 are formed between the individual folds 66 in the filter material 59 folded with the same inner and outer bend radii. As a result, not only are surface areas of the filter material 59 exposed as effective filter surface, but also free spaces are formed for descending water droplets, which will be explained in more detail below.

On the outside, the cellulose filter material 59 is enveloped by a particle filter 69, which, like the cellulose filter material 59, is arranged as a circular cylindrical hollow body between the end caps 13 and 19. The particle filter 69 is made in the usual manner from several pleated layers in the nature of a mesh pack. Situated between the particle filter 69 and the cellulose filter material 59 is a further fluid-permeable support tube 71, which extends from the bottom end cap 13 to the top end cap 19.

FIG. 6 shows a simplified schematic of the production of the pleated filter pad 61 which forms the filter material 59 according to the method of the invention. As shown, a web 75 of the more than 2 mm thick cellulose material is moved through in the direction indicated by the arrow 77 under a spray bar 79, which moistens the still flat web 75, bringing it into a softened state suitable for a pleating process. The web 75 then runs through a pleating machine of typical design, which carries out the pleating process using moveable pleating knives 81 and 83, to form the pleated filter pad 61. After the formation of the hollow body that forms the cellulose filter material 59, this hollow body is then closed by connecting its two longitudinal sides by a welding and/or bonding process, after which the cellulose filter material 59, when dry, is installed in the filter element 3. Before carrying out the pleating process, a layer forming a protective cover, which is preferably composed of a non-woven or woven fabric such as a fine metal mesh, is applied on one side, preferably on both sides, of the still flat web 75 and pleated together with the respective other layers by the pleating machine.

In the filtration mode, in the example of the device shown in FIG. 1, there is a flow through the filter element 3 from the outside of the particle filter 69 into the inner filter cavity 17. Accordingly, the connection point 41 forms the inlet for the unfiltrate, which is in the form of an oil-water emulsion. During the throughflow, the cellulose material of the cellulose filter material 59 acts as a coalescing medium so that enlarged droplets are formed from the water content of the emulsion. These droplets descend along the support tube 63 and descend via the openings 15 of the end cap and the openings 25 in the wall 23 of the intermediate bottom 11 into the chamber 43, which thus forms a water collection chamber. In this case the connection point 47 situated on the floor of the chamber 43 forms the outlet for separated water. The connection point 45 forms the filtrate outlet for the filtrate, which likewise flows from the inner filter cavity 17 into the chamber 43 via the openings 15 and 21. Because the connection point 45 is arranged in the top end region of the chamber 43, it is situated at a level above the dividing line formed by the oil/water density difference.

In the exemplary embodiment of FIG. 2, in the operating mode there is a flow through the filter element 3 from the inner filter cavity 17 thereof to the outside. Accordingly, the connection point 41 to the chamber 44 below the intermediate bottom 11 forms the inlet for the oil-water emulsion, which flows via the opening 25 between the annular body 51 into the filter cavity 17. The water droplets formed by coalescence as the emulsion flows through the cellulose fiber material 59, which descend along the downstream-side support tube 71, arrive with the given direction of flow at the filtrate side 55, which transitions at the bottom end cap 13 into the chamber 53. Chamber 53 is delimited by the intermediate bottom 11 and the outside of the annular body 51 of the bottom part 7. This chamber 53 thus forms the water collection chamber, from which the separated water flows out via the connection point 47 situated on the chamber 53. The oil flows out as filtrate via the connection point 45 on the housing lid 9, which forms the top closure of the filtrate side 55.

While various embodiments have been chosen to illustrate the invention, it will be understood by those skilled in the art that various changes and modifications can be made therein without departing from the scope of the invention as defined in the claims.

The invention claimed is:
1. A replaceable filter element, comprising:
   identical first and second end caps;
   a cellulose filter medium being formed as a one piece hollow body, being pleated with individual filter folds and extending between the first and second end caps, the cellulose filter medium having a uniform thickness more than 2 mm, the filter folds having equal heights and equal bend radii in valleys and peaks of the filter folds, the filter folds of the cellulose filter medium being merged integrally into one another except for a joint between two adjacent and mutually facing longitudinal edges of the cellulose filter medium, the filter folds delimiting fluid spaces tapering toward the bend radii;
   a particle filter medium extending between the first and second end caps as a hollow body and being with filter folds having a greater packing density and having greater fold heights than the filter folds of the cellulose filter medium, the particle filter medium enclosing the cellulose filter medium;
a fluid-permeable first support tube extending between an outside surface of the cellulose filter medium and an inside surface of the particle filter medium;
a fluid-permeable second support tube extending on an inside surface of the cellulose filter medium; and
first and second sealing spacers on axially outwardly facing surfaces of the first and second end caps, respectively.

2. A replaceable filter element according to claim 1 wherein
the longitudinal edges are firmly connected by a weld or a bond.

3. A replaceable filter element according to claim 1 wherein
the cellulose filter medium is capable of separating water from hydraulic fluids by increasing volumes of water droplets in a water-oil mixture such that the water droplets increased in volume descend under an effect of gravity owning to a difference in density of water and oil.

4. A replaceable filter element according to claim 1 wherein
the cellulose filter medium has protective layers of non-woven or woven fabric on inside and outside surfaces of the cellulose filter medium.

5. A replaceable filter element according to claim 1 wherein
the cellulose filter medium is enveloped by the particle filter medium.

6. A replaceable filter element according to claim 1 wherein
the particle filter medium envelopes a downstream side of the cellulose filter medium.

7. A filter device, comprising
a filter housing having a receiving chamber;
a receiving rod traversing most of the receiving chamber;
a replaceable filter element being centrally positioned and being secured on the receiving rod by a securer, the filter element including
first and second end caps, the first end cap being coupled to the receiving rod, the second end cap being mounted on an intermediate bottom of the filter housing,
a cellulose filter medium being formed as a one piece hollow body, being pleated with individual filter folds and extending between the first and second end caps, the cellulose filter medium having a uniform thickness more than 2 mm, the filter folds having equal heights and equal bend radii in valleys and peaks of the filter folds, the filter folds of the cellulose filter medium merged integrally into one another except for a joint between two adjacent and mutually facing longitudinal edges of the cellulose filter medium, the filter folds delimiting fluid spaces tapering toward the bend radii,
a particle filter medium extending between the first and second end caps as a hollow body and being with filter folds having greater fold heights than the filter folds of the cellulose filter medium, the particle filter medium enclosing the cellulose filter medium,
a fluid-permeable first support tube extending between an outside of the cellulose filter medium and an inside surface of the particle filter medium, and
a fluid-permeable second support tube extending on an inside surface of the cellulose filter medium;
an inlet port in direct fluid communication with an outside surface of the particle filter medium;
a collection chamber on a side of the intermediate bottom remote from the filter element and in direct fluid communication with an inner filter cavity of the cellulose filter medium through openings in the filter element and the intermediate bottom;
a filtrate outlet in an upper part of the collection chamber; and
a water outlet in a bottom of the collection chamber.

8. A filter device according to claim 7 wherein
each of the first and second end caps is mounted on the receiving rod via spacer with a seal on the securer and on an intermediate bottom of the filter housing.

9. A filter device according to claim 7 wherein
the filter housing is installable in a fluid tank and is sealed relative to an environment outside the filter housing by a removable housing lid.

10. A method for producing a filter element, the method comprising the steps of:
positioning a flat cellulose filter pad having a uniform thickness of more than 2 mm;
pleating the cellulose pad after moistening the flat cellulose filter pad by a pleating machine forming filter holds having equal heights and equal bend radii in valleys and peaks of the filter folds being merged integrally into one another except for a joint between two adjacent and mutually facing longitudinal edges of the cellulose filter medium and delimiting fluid spaces tapering toward the bend radii;
forming the cellulose pad into a cellulose hollow cylindrical body after the pleating;
joining two longitudinal sides of the cellulose hollow body by welding or bonding;
drying the cellulose hollow cylinder;
positioning a fluid-permeable first support tube on an outside surface of the cellulose hollow body;
positioning a fluid-permeable second support tube on an inside surface of the cellulose hollow body;
providing a pleated and hollow cylindrical particle filter medium body with filter holds having a greater packing density and having greater fold heights than the filter folds of the cellulose hollow cylinder on an outside surface of the first support tube and about the cellulose hollow cylinder; and
mounting first and second end caps on axial ends of the cellulose hollow cylinder and the particle filter medium body with first and second sealing spacers on axially outwardly facing surfaces of the first and second end caps, respectively.

11. A method according to claim 10 wherein
non-woven or woven fabrics are applied to both sides of the flat cellulose filter pad before the pleating such that the fabrics and the flat cellulose filter pad are pleated together by the pleating machine.

12. A filter device, comprising
a filter housing having a receiving chamber;
a receiving rod traversing most of the receiving chamber;
a replaceable filter element being centrally positioned and being secured on the receiving rod by a securer, the filter element including
first and second end caps, the first end cap being coupled to the receiving rod, the second end cap being mounted on an intermediate bottom of the filter housing, a cellulose filter medium being formed as a one piece hollow body, being pleated with individual filter folds and extending between the first and second end caps, the cellulose filter medium having a uniform thickness more than 2 mm, the filter folds having equal heights and equal bend radii in valleys and peaks of the filter folds, the filter folds of the cellulose filter medium merged integrally into one another except for a joint between two adjacent and mutually facing longitudinal edges of the cellulose filter medium, the filter folds delimiting fluid spaces tapering toward the bend radii, a particle filter medium extending between the first and second end caps as a hollow body and being with filter folds having greater fold heights than the filter folds of the cellulose filter medium, the particle filter medium enclosing the cellulose filter medium, a fluid-permeable first support tube extending between an outside of the cellulose filter medium and an inside surface of the particle filter medium, and a fluid-permeable second support tube extending on an inside surface of the cellulose filter medium;

an inlet port in direct fluid communication with an inside cavity of the cellulose filter medium via openings in the second support tube and the intermediate bottom;

a collection chamber on a side of the intermediate bottom adjacent the filter element;

a filtrate outlet in an upper part of the collection chamber; and a water outlet in a bottom of the collection chamber.

13. A filter device according to claim 12 wherein first and second cylindrical support rings are on the first and second end caps, respectively, and extend on inside surface portions of the second support tube; and first and second sealing spacers are on axially outwardly facing surfaces of the first and second end caps, respectively.

14. A filter device according to claim 7 wherein first and second cylindrical support rings are on the first and second end caps, respectively, and extend on inside surface portions of the second support tube; and first and second sealing spacers are on axially outwardly facing surfaces of the first and second end caps, respectively.

15. A replaceable filter element according to claim 1 wherein first and second cylindrical support rings are on the first and second end caps, respectively, and extend on inside surface portions of the second support tube.

16. A method according to claim 10 wherein first and second cylindrical support rings are on the first and second end caps, respectively, and extend on inside surface portions of the second support tube.

* * * * *